US007831420B2

(12) United States Patent
Sinder et al.

(10) Patent No.: US 7,831,420 B2
(45) Date of Patent: Nov. 9, 2010

(54) VOICE MODIFIER FOR SPEECH PROCESSING SYSTEMS

(75) Inventors: Daniel J. Sinder, San Diego, CA (US); Ananthapadmanabhan Aasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1073 days.

(21) Appl. No.: 11/398,364

(22) Filed: Apr. 4, 2006

(65) Prior Publication Data

US 2007/0233472 A1 Oct. 4, 2007

(51) Int. Cl.
*G10L 19/14* (2006.01)
*G10L 11/00* (2006.01)
*G06F 15/00* (2006.01)
*G10L 19/02* (2006.01)

(52) U.S. Cl. ........................ 704/225; 704/200; 704/203

(58) Field of Classification Search ................. 704/200, 704/203, 225

See application file for complete search history.

(56) References Cited

U.S. PATENT DOCUMENTS

| | | | | |
|---|---|---|---|---|
| 4,937,868 | A * | 6/1990 | Taguchi | 704/220 |
| 4,975,956 | A * | 12/1990 | Liu et al. | 704/219 |
| 5,365,050 | A * | 11/1994 | Worthington et al. | 235/472.02 |
| 5,727,123 | A * | 3/1998 | McDonough et al. | 704/224 |
| 5,750,912 | A | 5/1998 | Matsumoto | |
| 5,787,391 | A * | 7/1998 | Moriya et al. | 704/225 |
| 5,890,108 | A * | 3/1999 | Yeldener | 704/208 |
| 5,911,129 | A | 6/1999 | Towell | |
| 5,915,234 | A * | 6/1999 | Itoh | 704/219 |
| 5,915,237 | A | 6/1999 | Boss et al. | |
| 5,933,805 | A | 8/1999 | Boss et al. | |
| 5,937,378 | A * | 8/1999 | Serizawa | 704/230 |
| 5,960,389 | A * | 9/1999 | Jarvinen et al. | 704/220 |
| 5,987,406 | A * | 11/1999 | Honkanen et al. | 704/220 |
| 6,202,045 | B1 * | 3/2001 | Ojala et al. | 704/203 |
| 6,219,642 | B1 * | 4/2001 | Asghar et al. | 704/256.8 |
| 6,240,299 | B1 * | 5/2001 | Song | 455/550.1 |
| 6,260,009 | B1 | 7/2001 | Dejaco | |

(Continued)

FOREIGN PATENT DOCUMENTS

EP 0770987 A2 5/1997

OTHER PUBLICATIONS

Ribeiro C M et al., "Application of Speaker Modification Techniques to Phonetic Vocoding," Spoken Language, 1996. ICSLP 96. Proceedings., Fourth International Conference on Philadelphia, PA, USA Oct. 3-6, 1996, New York, NY, USA, IEEE, US, vol. 1, Oct. 3, 1996, pp. 306-309.

(Continued)

*Primary Examiner*—Eric Yen
(74) *Attorney, Agent, or Firm*—Alexander C. Chen; Anthony Mauro

(57) ABSTRACT

A speech converter in a speech processing system modifies various aspects of input speech. The speech converter receives a formants signal representing an input speech signal. The speech converter may also receive a formant scaling command or a user selection of one of multiple control signals, each specifying a manner of modifying one or more of the received signals (i.e., formants, voicing, pitch, gain). The speech converter modifies at least one of the formants, voicing, pitch, and/or gain signals as specified by the selected voice font.

23 Claims, 6 Drawing Sheets

U.S. PATENT DOCUMENTS

| | | | | |
|---|---|---|---|---|
| 6,289,085 | B1 | 9/2001 | Miyashita et al. | |
| 6,336,092 | B1 | 1/2002 | Gibson et al. | |
| 6,370,500 | B1 * | 4/2002 | Huang et al. | 704/208 |
| 6,408,273 | B1 | 6/2002 | Quagliaro et al. | |
| 6,411,933 | B1 | 6/2002 | Maes et al. | |
| 6,661,862 | B1 * | 12/2003 | Butcher | 375/375 |
| 6,691,082 | B1 * | 2/2004 | Aguilar et al. | 704/219 |
| 6,741,960 | B2 * | 5/2004 | Kim et al. | 704/219 |
| 6,789,066 | B2 | 9/2004 | Junkins et al. | |
| 6,810,378 | B2 | 10/2004 | Kochanski et al. | |
| 6,816,832 | B2 * | 11/2004 | Alanara et al. | 704/205 |
| 6,950,799 | B2 * | 9/2005 | Bi et al. | 704/261 |
| 7,031,912 | B2 * | 4/2006 | Yajima et al. | 704/208 |
| 7,133,521 | B2 * | 11/2006 | Jabri et al. | 379/386 |
| 7,209,878 | B2 * | 4/2007 | Chen | 704/220 |
| 7,386,447 | B2 * | 6/2008 | Li et al. | 704/221 |
| 7,493,255 | B2 * | 2/2009 | Al-Naimi et al. | 704/219 |
| 2001/0051874 | A1 | 12/2001 | Tsuji | |
| 2003/0158728 | A1 * | 8/2003 | Bi et al. | 704/207 |
| 2004/0006463 | A1 * | 1/2004 | Al-Naimi et al. | 704/219 |
| 2004/0174984 | A1 * | 9/2004 | Jabri et al. | 379/386 |
| 2005/0021325 | A1 * | 1/2005 | Seo et al. | 704/207 |

OTHER PUBLICATIONS

Min Tang et al., “Voice Transformations: From Speech Synthesis to Mammalian Vocalizations,” European Conference on Speech Communication (EuroSpeech), 2001, pp. 353-356.

Arslan L M., “Speaker Transformation Algorithm Using Segmental Codebooks (STASC),” Speech Communication, Elsevier Science Publishers, Amerstdam, NL, vol. 28, No. 3, Jul. 1999, pp. 211-226.

PCT Search Report, Aug. 1, 2007.

Rabiner, L.R., and Juang, B.H., “Fundamentals of Speech Recognition”, Prentice Hall PTR, ch, 1-2, pp. vii-68, 1993.

Rabiner, L.R., and Juang, B.H., “Fundamentals of Speech Recognition”, Prentice Hall PTR, ch, 3, pp. 69-140, 1993.

Masanobu, et al.:“Voice Conversion Through Vector Quantization”, IEEE 1998 pp. 655-658.

Schwardt, et al.: Voice Conversion Based on Static Speaker Characteristics, IEEE 1998, pp. 57-62.

Verma, et al.: “Articulatory class based spectral envelope representation,” 2004 IEEE International Conference on Multimedia and Expo, 2004, ICME ’04, Jun. 27-30, 2004, vol. 3, pp. 1647-1650.

* cited by examiner

VOICE MODIFIER FOR SPEECH PROCESSING SYSTEMS

BACKGROUND

1. Field

The present disclosure relates to speech processing, and more particularly, to a voice modifier.

2. Description of the Related Art

Speech conversion is a technology to convert one speaker's voice into another's, such as converting a male's voice to a female's and vice versa. The SOUNDBLASTER software package by Creative Technology Ltd., which runs on a personal computer, is one of few known sound effect products that can be used to modify speech. This product utilizes an input signal comprising a digitized analog waveform in wideband PCM form, and serves to modify the input signal in various ways depending upon user input. Some exemplary effects are entitled female to male, male to female, Zeus, and chipmunk.

Although products such as SOUNDBLASTER are useful for some applications, they are not quite adequate when considered for use in more compact applications than personal computers, or when considered for applications requiring more advanced modes of speech conversion. Namely, personal computers offer abundant memory, wideband sampling frequency, enormous processing power, and other such resources that are not always available in compact applications such as wireless telephones. Depending upon the desired complexity of conversion, it can be challenging or impossible to develop speech conversion systems for applications of such compactness.

An additional problem with known speech modification software is the converted speech does not always sound natural.

Consequently, known speech conversion systems are not always completely adequate for all applications due to certain unsolved problems.

SUMMARY

The present disclosure relates to a method and apparatus for speech conversion that modifies various aspects of input speech. Initially, a speech converter receives signals including a formants signal representing an input speech signal and a pitch signal representing the input signal's fundamental frequency. Optionally, one or both of the following may be additionally received: a voicing signal comprising an indication of whether the input speech signal is voiced or unvoiced or mixed, and/or a gain signal representing the input signal's energy. The speech converter also receives control signals specifying a manner of modifying one or more of the received signals (i.e., formants, voicing, pitch, and gain). For instance, different control signals may prescribe signal modification to create a monotone voice, deep voice, female voice, melodious voice, whisper voice, or other effect. The speech converter modifies one or more of the received signals as specified by the selected control signals.

The present application may provide its users with a number of distinct advantages. For example, the application may provide a speech converter that is compact yet powerful in its features. In addition, the speech converter may be compatible with narrowband signals such as those utilized aboard wireless telephones. Another possible advantage of the application is separately modifying speech qualities such as pitch and formants. This may avoid unnatural speech produced by conventional speech conversion packages that apply the same conversion ratio to both pitch and formants signals.

The application may also provide a number of other advantages and benefits, which should be apparent from the following description.

DETAILED DESCRIPTION

Components & Interconnections

Overall Structure

Figure 1:
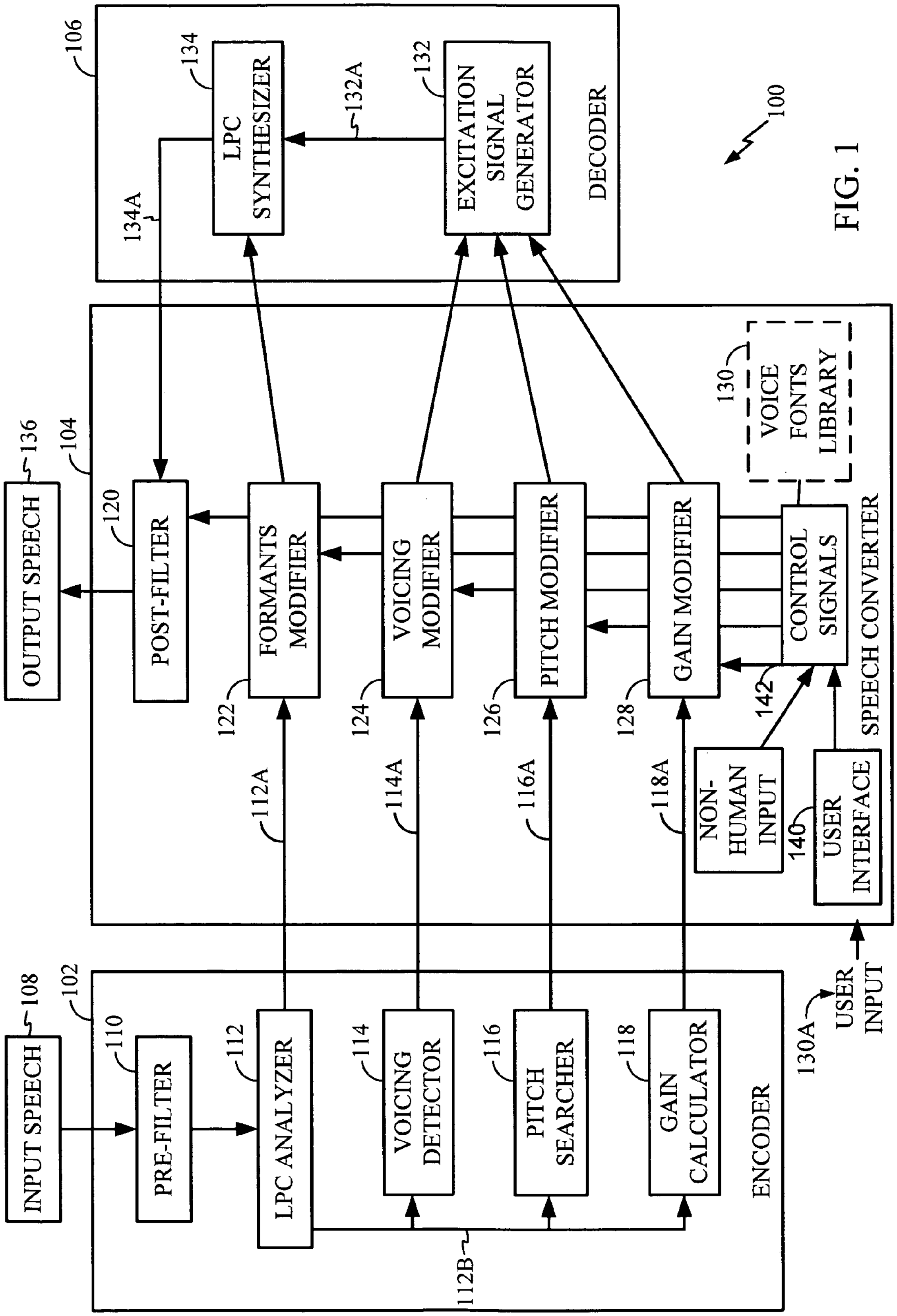
FIG. 1 is a block diagram of components and interconnections of a speech processing system.

FIG. 1 shows an example of a speech processing system 100, which may be embodied by various components and interconnections. The speech processing system 100 includes various subcomponents, each of which may be implemented by a hardware device, a software device, a portion of a hardware or software device, or a combination of the foregoing. The makeup of these subcomponents is described in greater detail below, with reference to an exemplary digital data processing apparatus, logic circuit, and signal bearing medium.

The system 100 receives input speech 108, encodes the input speech with an encoder 102, modifies the encoded speech with a speech converter 104 (may also be called a voice or speech modifier), decodes the modified speech with a decoder 106, and optionally modifies the decoded speech again with the speech converter 104. The result is output speech 136.

Unlike prior products such as the SOUNDBLASTER software package, the system 100 employs a speech production model to describe speech being processed by the system 100. The speech production model, which is known in the field of artificial speech generation, recognizes that speech can be modeled by an excitation source, an acoustic filter representing the frequency response of the vocal tract, and various radiation characteristics at the lips. The excitation source may comprise a voiced source, which is a quasi-periodic train of glottal pulses, an unvoiced source, which is a randomly varying noise generated at different places in the vocal tract, or a combination of these. An all pole infinite impulse response (IIR) filter models the vocal tract transfer function, in which the poles are used to describe resonance frequencies or formant frequencies of the vocal tract. For each individual, the excitation source can be distinguished because of the fundamental frequency of voiced speech. The formant frequencies can be distinguished because of geometrical configuration of the vocal tract. In order to modify formants and pitch independently, the present application separates formants and pitch in the encoder, which is designed based on the speech production model.

The encoder 102 and decoder 106 may be implemented utilizing teachings of various products. For instance, the encoder 102 may be implemented by various known signal encoders provided aboard wireless telephones. The decoder 106 may be implemented utilizing teachings of various signal encoders known for implementation at base stations, hubs, switches, or other network facilities of wireless telephone networks. Each connection formed in digital wireless telephony may implement some type of encoder and decoder. Unlike known encoders and decoders, however, the system 100 includes an intermediate component embodied by the speech converter 104, described in greater detail below. Moreover, as described in greater detail below, both encoder and decoder may be provided in the same wireless telephone or other computing unit.

Encoder

Referring to FIG. 1 in greater detail, the encoder 102 analyzes the input speech 108 to identify various properties of the input speech including the formants, voicing, pitch, and gain. These features are provided on the outputs 112A, 114A, 116A, and 118A. Optionally, the voicing and/or gain signals and subsequent processing thereof may be omitted for applications that do not seek to modify these aspects of speech. The encoder 102 includes a pre-filter 110, which divides the input speech into appropriately sized windows or frames, such as 20 milliseconds. Subsequent processing of the input speech may be performed window by window (frame by frame) in the illustrated embodiment. In addition, the pre-filter 110 may perform other functions, such as blocking DC signals or suppressing noise.

The LPC analyzer 112 applies linear predictive coding (LPC) to the output of the pre-filter 110. As illustrated, the LPC analyzer 112 and subsequent processing stages may process input speech one window at a time. For ease of reference, however, processing is broadly discussed in terms of the input speech and its byproducts. LPC analysis is a known technique for separating the source signal from vocal tract characteristics of speech, as taught in various references including the text L. Rabiner & B. Juang, Fundamentals of Speech Recognition. The entirety of this reference is incorporated herein by reference. The LPC analyzer 112 provides LPC coefficients (on the output 112A) and a residual signal on outputs 112B. The LPC coefficients are features that describe formants.

The residual signal is directed to a voicing detector 114, pitch searcher 116, and gain calculator 118, which provide output signals at respective outputs 114A, 116A, 118A. The components 114, 116, 118 process the residual signal to extract source information representing voicing, pitch, and gain, respectively. In one example, "voicing" represents whether the input speech 108 is voiced, unvoiced, or mixed; "pitch" represents the fundamental frequency of the input speech 108; "gain" represents the energy of the input speech 108 in decibels or other appropriate units. Optionally, one or both of the voicing detector 114 and gain calculator 118 may be omitted from the encoder 102. Optionally, a storage device 702 in FIG. 7 may record and retain output signals 112A, 114A, 116A, and 118A for later retrieval.

Figure 6:
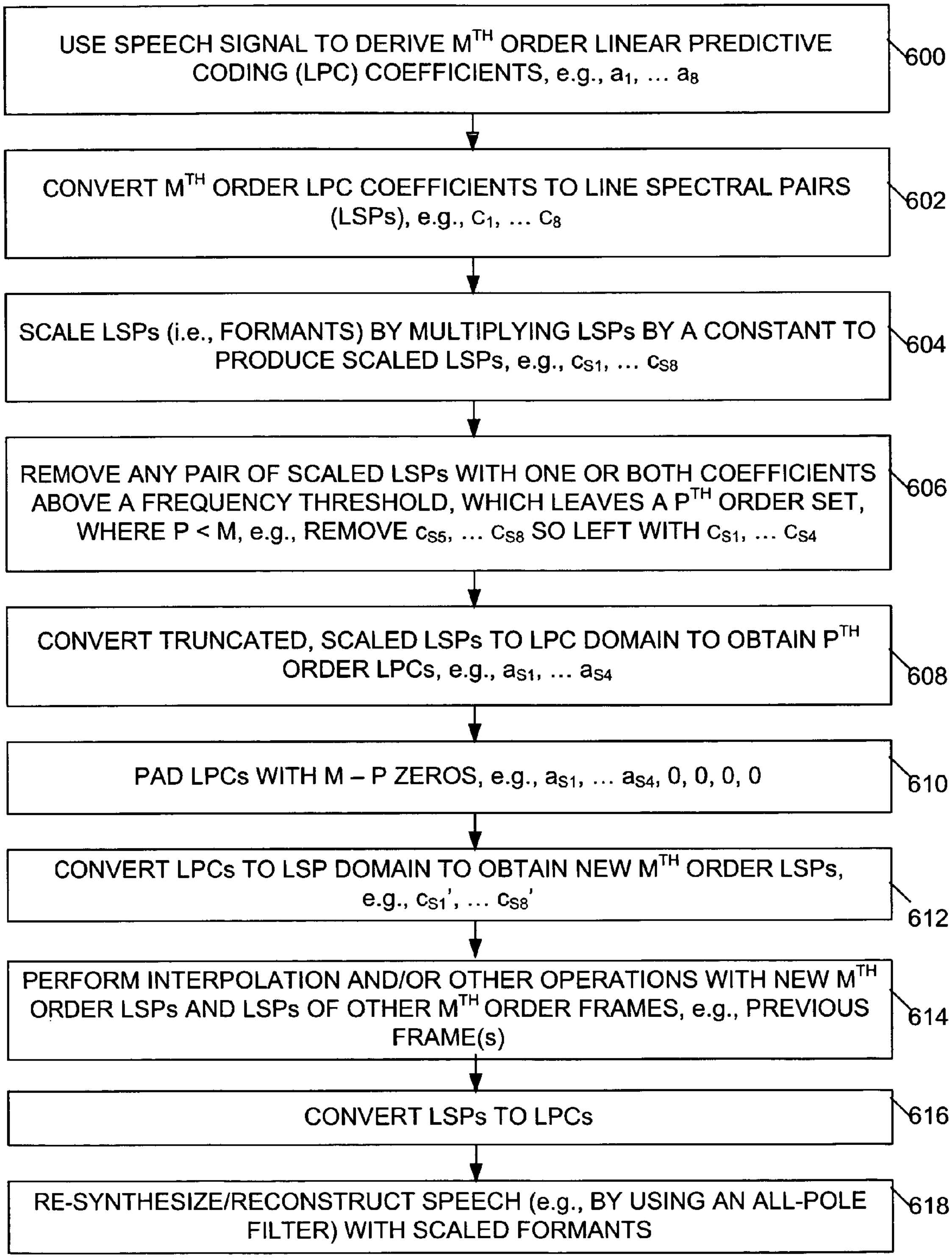
FIG. 6 illustrates a method that may be implemented by one or more components shown in FIG. 1 as a part of the flowchart of FIG. 5.
Figure 7:
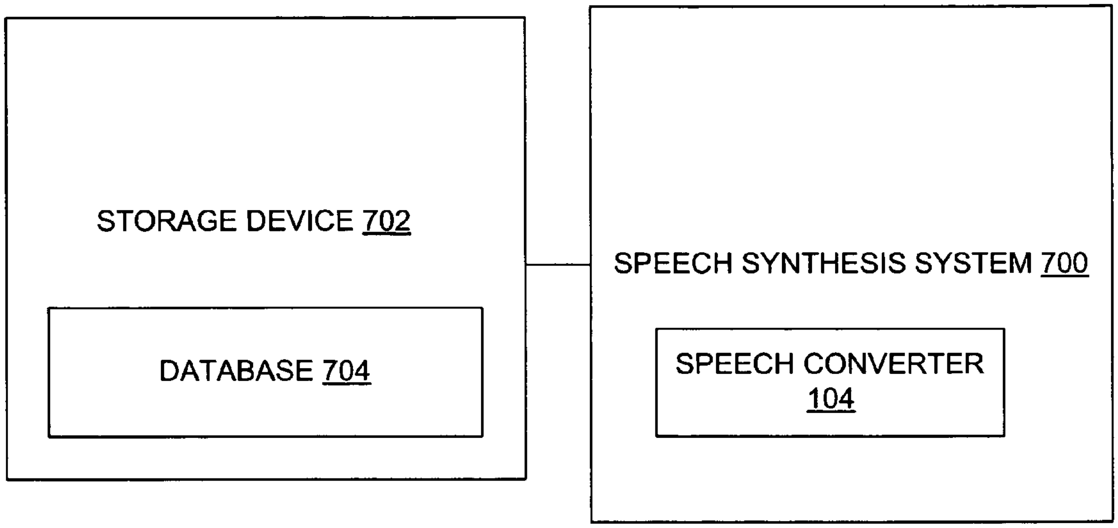
FIG. 7 illustrates a storage device and a speech synthesis system, which may implement the method of FIG. 6.

FIG. 7 illustrates a storage device 702 and a speech synthesis system 700, which may implement the method of FIG. 6. The speech synthesis system 700 may be a text-to-speech (TTS) system. Input speech for the speech synthesis system 700 may come in the form of small segments of speech copied from disparate locations in a large stored speech database 704 in the storage device 702. Alternatively, the database 704 may store encoded speech signals 112A, 114A, 116A, and 118A from encoder 102 in FIG. 1 for a period of time until user input 130A, e.g., automated text analysis, retrieves certain portions for subsequent modification, decoding, and synthesis. The speech synthesis system 700 comprises a speech converter 104 and may include other elements.

Speech Converter or Modifier

The speech converter 104 receives the formants, voicing, pitch, and gain signals from the encoder 102 or optional storage device, and modifies one, some, or all of these signals as dictated by a set of control signals 142. Each control signal 142 contains instructions on how to modify a specified one or more of formants, voicing, pitch, and/or gain to achieve a desired speech conversion result. The control signals 142 may come from a non-human source or from a user interface 140 configured to receive user input 130A. The control signals 142 may or may not access an optional voice fonts library 130. The library 130 may be implemented by circuit memory, magnetic disk storage, sequential media such as magnetic tape, or any other storage media. Each voice font represents a different profile containing instructions on how to modify a specified one or more of formants, voicing, pitch, and/or gain to achieve a desired speech conversion result.

The user input 130A may be received by an interface 140 such as a keypad, button, switch, dial, touch screen, or any other human user interface. Alternatively, where the user is non-human, the control signals 142 may arrive from a network, communications channel, storage, wireless link, or other communications interface to receive input from a user such as a host, network attached processor, application program, etc.

In one embodiment, the control signals 142 may also select signals 112A, 114A, 116A, and 118A that have been previously recorded to a storage device 702 in FIG. 7. For example, a text-to-speech synthesis system 700 may generate the control signals 142 from an analysis of text. Control signals 142 may then select signals 112A, 114A, 116A, and 118A from the storage device 702 as well as control the elements of the speech converter 104.

According to the user-selected input 130A, the user interface 140 makes the respective control signals 142 available to the formants modifier 122, voicing modifier 124, pitch modifier 126, gain modifier 128, and (as separately described below) post-filter 120. Each control signal 142 specifies the modification (if any) to be applied by each of the components 122, 124, 126, 128 when those control signals 142 are selected by user input 130A.

The formants modifier 122 may be implemented to carry out various functions, as discussed more thoroughly below. In one example, the formants modifier 122 multiplies the LPC coefficients on the line 112A by multipliers specified in a matrix that is specified by the user selected control signals 142. In another example, the formants modifier 122 converts the LPC coefficients into the linear spectral pair (LSP) domain, multiplies the resultant LSP pairs by a constant, and converts the LSP pairs back into LPC coefficients. This example is described further below with FIG. 6. LSP technology is discussed in the above-cited reference to Rabiner and Juang entitled "Fundamentals of Speech Recognition."

The voicing modifier 124 changes the voicing signal 114A to a desired value of voiced, unvoiced, or mixed, as dictated by the user selected voice font. The pitch modifier 126 multiplies the pitch signal 116A by a ratio such as 0.5, 1.5, or by a table of different ratios to be applied to different syllables, time slices, or other subcomponents of the signal 116A. As another alternative, the pitch modifier 126 may change pitch to a predefined value (monotone) or multiple different predefined or user-specified values combined in simultaneously (such as vocal harmony) or sequentially (such as a melody). The gain modifier 128 changes the gain signal **118*a*** by multiplying it by a ratio, or by a table of different ratios to be applied over time.

The control signals 142 may be tailored to provide independent control over various speech conversion effects. By allowing for independent control, a user may modify speech to suit personal preference or desired application goals. For example, by modifying pitch and formants with certain ratios, speech may be converted from male to female and vice versa. In some cases, one ratio may be applied to pitch and a different ratio applied to formants in order to achieve more natural sounding converted speech. Alternatively, speech may be made to sound as if originating from a taller or shorter person by modifying formants by certain ratios. As another example, a robotic voice may be created by fixing pitch at a certain value, optionally fixing voicing characteristics, and optionally modifying formants by increasing resonance. In still another example, talking speech may be converted to singing speech by changing pitch to that of a user specified melody or combination of pitches for harmony, or both harmony and melody together for a choral effect.

Optionally, the speech converter 104 may include a post-filter 120. According to contents of the user-selected control signals 142, the post-filter 120 applies an appropriate filtering process to signals from the decoder 106 (discussed below). In one embodiment, the post-filter 120 performs spectral slope modification of the decoded speech. As a different or additional function, the post-filter 120 may apply filtering such as low pass, high pass, or active filtering. Some examples include finite impulse response (FIR) and infinite impulse response (IIR) filters. One exemplary filtering scheme applies $y(n)=x(n)+x(n-L)$ to generate an echo effect.

Decoder

Generally, the decoder 106 may perform a function opposite to the encoder 102, namely, recombining the formants, voicing, pitch, and gain (as modified by the speech converter 104) into output speech. The decoder 106 includes an excitation signal generator 132, which receives the voicing, pitch, and gain signals (with any modifications) from the converter 104 and provides a representative LPC residual signal on a line 132A. The structure and operation of the generator 132 may be according to principles familiar to those in the relevant art.

An LPC synthesizer 134 applies inverse LPC processing to the formants from the formants modifier 122 and the residual signal 132A from the generator 132 to generate a representative speech signal on an output 134A. Thus, the synthesizer 134 and generator 132 may perform an inverse function to the LPC analyzer 112. The structure and operation of the synthesizer 134 may be according to principles familiar to those in the relevant art.

In one embodiment, the output 134A of the LPC synthesizer 134 may be utilized as the output speech 136. Alternatively, as discussed above and illustrated in FIG. 1, the speech signal 134A output by the LPC synthesizer may be routed back to the post-filter 120 and modified as specified by the user selected voice font. In this case, the output of the post-filter 120 becomes the output speech 136 as illustrated in FIG. 1.

Exemplary Digital Data Processing Apparatus

As mentioned above, data processing entities such as the speech processing system 100, or one or more individual components thereof, may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the application. As a specific example, one of the components 206, 208 may be eliminated. Furthermore, the storage 204, 206, and/or 208 may be provided on-board the processor 202, or even provided externally to the apparatus 200.

Logic Circuitry

In contrast to the digital data processing apparatus discussed above, another embodiment of the application may use logic circuitry instead of computer-executed instructions to implement some or all processing entities of the speech processing system 100. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Wireless Telephone

Figure 3:
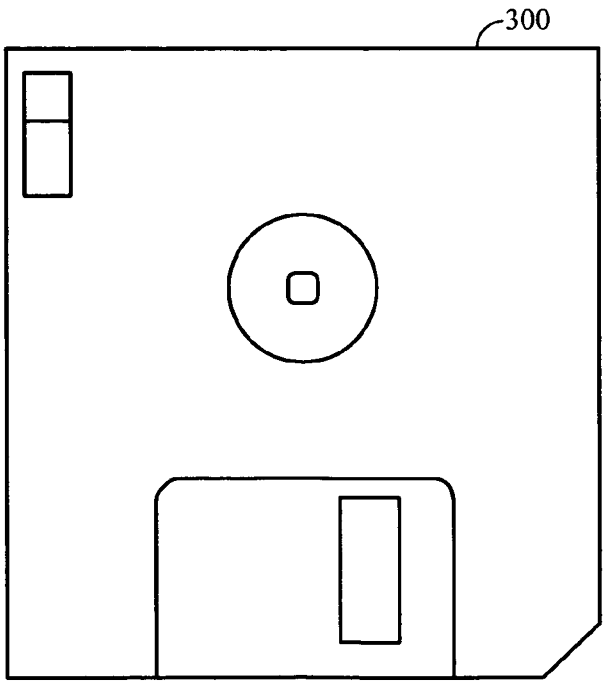
FIG. 3 shows an exemplary signal-bearing medium.
Figure 4:
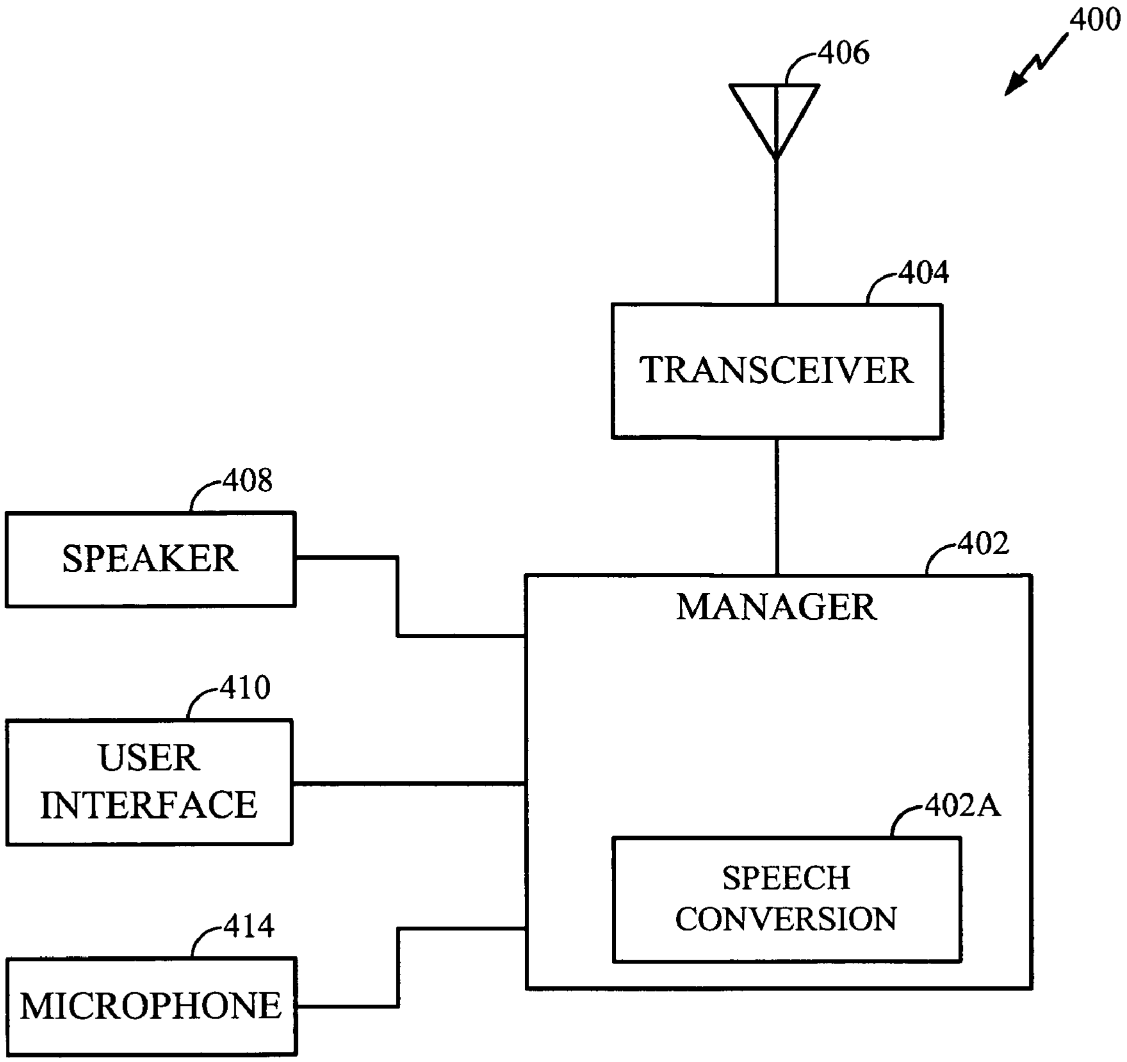
FIG. 4 is a block diagram of a wireless telephone including a speech converter.

In one exemplary application, without any limitation, the speech processing system 100 of FIG. 1 may be implemented in a wireless telephone 400 (FIG. 4), along with other circuitry known in the art of wireless telephony. The telephone 400 includes a speaker 408, user interface 410, microphone 414, transceiver 404, antenna 406, and manager 402. The manager 402, which may be implemented by circuitry discussed above with FIGS. 2-3, manages operation of the components 404, 408, 410, and 414 and signal routing therebetween. The manager 402 includes a speech conversion module 402A, which may be embodied by the system 100. The module 402A performs a function such as obtaining input speech from a default or user-specified source, such as the microphone 414 and/or transceiver 404, modifying the input speech in accordance with directions from the user received via the interface 410, and providing the output speech to the speaker 408, transceiver 404, or other default or user-specified destination.

As an alternative to the telephone 400, the system 100 may be implemented in a variety of other devices, such as a personal computer, laptop computer, computing workstation, network switch, personal digital assistant (PDA), or any other application.

Operation

Having described the structural features of the present application, the operational aspect of the present application will now be described.

Signal-Bearing Media

Figure 2:
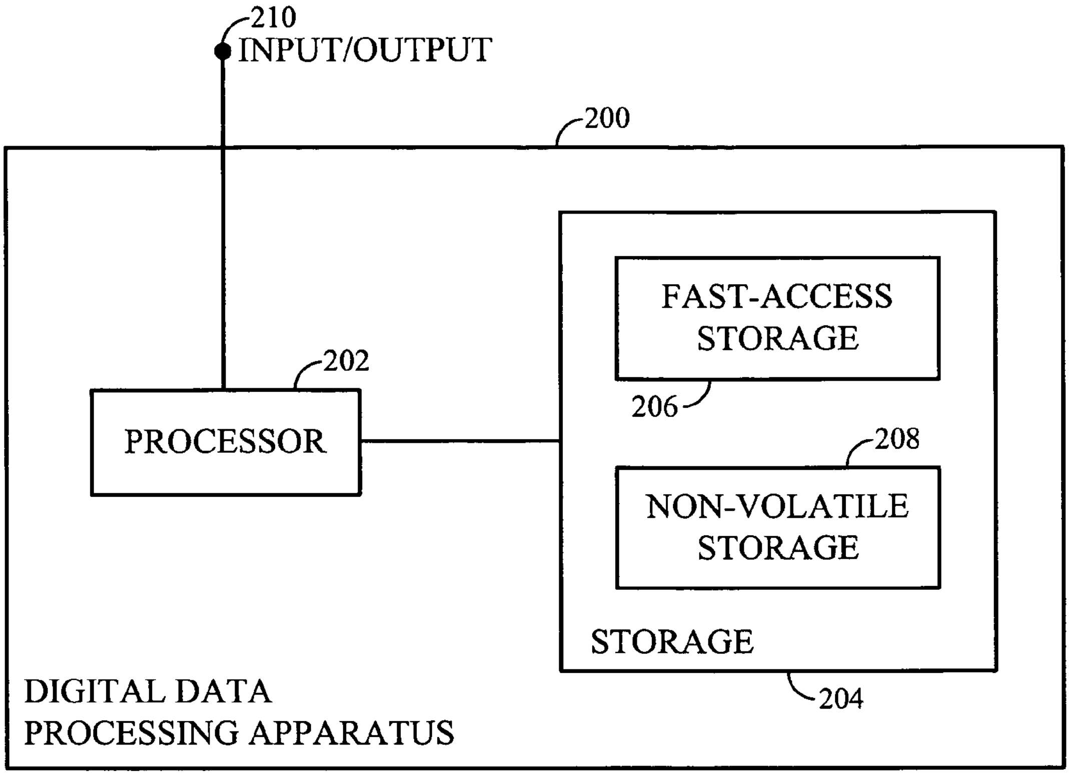
FIG. 2 is a block diagram of a digital data processing machine.

Wherever some functionality of the application is implemented using one or more machine-executed program sequences, these sequences may be embodied in various forms of signal-bearing media. In the context of FIG. 2, such a signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive," redundant array of inexpensive disks ("RAID"), or another direct access storage device ("DASD")), serial-access storage such as magnetic or optical tape, electronic non-volatile memory (e.g., ROM, EPROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the application, the machine-readable instructions may comprise software object code, compiled from a language such as assembly language, C, etc.

Logic Circuitry

Some or all of the application's functionality may be implemented using logic circuitry, instead of using a processor to execute instructions. Such logic circuitry is therefore configured to perform operations to carry out the method(s) of the application. The logic circuitry may be implemented using different types of circuitry, as discussed above.

Overall Sequence of Operation

Figure 5:
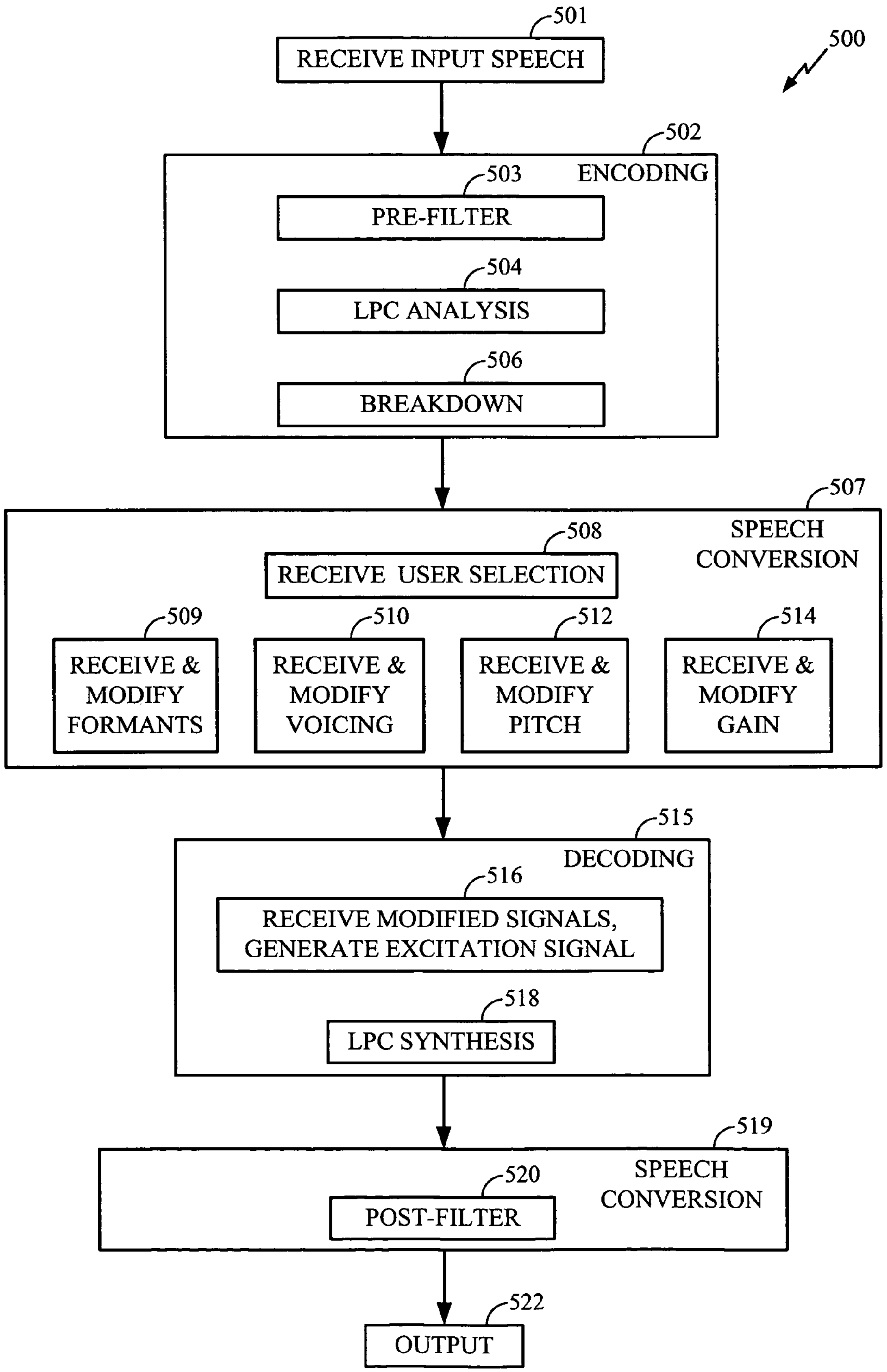
FIG. 5 is a flowchart of an operational sequence for speech conversion by modifying input speech signals as specified by a user-selected set of control signals.

FIG. 5 shows a speech conversion sequence 500 to illustrate one embodiment of the application. This sequence 500 involves tasks of modifying various aspects of a received speech signal according to (a) a user-selected set of control signals from a user interface or voice fonts library or (b) a set of control signals from a stored file format (a non-human source). A control signal is not limited to user-defined or user-interfaced. This voice modification control signal can also come from a stored file format that is the input to the synthesizer. For example, if someone makes a video game software, they can embed instructions to tell the rendering device (which may contain a speech synthesizer) to generate a voice with a specific effect decided by the game author.

Modifying various aspects of a received speech signal is accomplished by modifying formants, voicing, pitch, and/or gain of the speech signal as specified by the control signals 142. For ease of explanation, but without any intended limitation, the example of FIG. 5 is described in the context of the speech processing system 100 described above.

The sequence 500 is initiated in block 501, when the encoder 102 receives the input speech 108. Next is the encoding process 502. In block 503, the pre-filter 110 divides the input speech into appropriately sized windows (i.e., frames), such as 20 milliseconds. Subsequent processing of the input speech may be performed window by window in the illustrated embodiment. In addition, the pre-filter 110 may perform other functions, such as blocking DC signals or suppressing noise. In block 504, the LPC analyzer 112 applies LPC to the output of the pre-filter 110. As illustrated, the LPC analyzer 112 and each subsequent processing stage may separately process each window of input speech. For ease of reference, however, processing is broadly discussed in terms of the input speech and its byproducts. The LPC analyzer 112 provides LPC coefficients (formants) on the output 112A and a residual signal on the output 112B.

In block 506, the residual signal is broken down. Namely, the LPC analyzer 112 directs the residual signal to the voicing detector 114, pitch searcher 116, and gain calculator 118, and these components provide output signals at their respective outputs 114A, 116A, 118A. The components 114, 116, 118 process the residual signal to extract source information representing voicing, pitch, and gain. In the present example, as mentioned above, "voicing" represents whether the input speech 108 is voiced, unvoiced, or mixed; "pitch" represents the fundamental frequency of the input speech 108; "gain" represents the energy of the input speech 108 in decibels or other appropriate units. Optionally, if one or both of the voicing detector 114 and gain calculator 118 are omitted from the encoder 102, then the functionality of these components as illustrated herein is also omitted.

After block 502, speech conversion occurs in block 507. Alternatively, a storage device 702 may store the output of block 502 for a period of time prior to supplying it for speech conversion in block 507. In block 508, a non-human source or a user selects a set of control signals 142 through user interface 140 to be applied by the speech converter 104. The user interface 140 receives the user input 130A and accordingly makes the respective control signals 142 available to the formants modifier 122, voicing modifier 124, pitch modifier 126, and gain modifier 128. Optionally, in block 508, the user may also select a set of signals from block 507 that have been recorded on a storage device 702. Each control signal 142 specifies a particular modification (if any) to be applied by one or more of the components 122, 124, 126, 128 when that control signal 142 is produced by the user interface 140.

Each control signal 142 specifies a manner of modifying at least one of the received signals (i.e., formants, voicing, pitch, gain). The "user" may be a human operator, host machine, network-connected processor, application program, or other functional entity. In blocks 509, 510, 512, 514, the components 122, 124, 126, 128 receive and modify their respective input signals 112A, 114A, 116A, 118A. Namely, the formants modifier 112 receives a formants signal 112A representing the input speech signal 108 (block 509). The voicing modifier 124 receives a voicing signal 114A comprising an indication of whether the input speech signal 108 is voiced, unvoiced, or mixed (block 510). The pitch modifier 126 receives a pitch signal 116A comprising a representation of fundamental frequency of the input speech signal 108 (block 512). The gain modifier 128 receives a gain signal 118A representing energy of the input speech signal 108 (block 514).

Also in blocks 509, 510, 512, 514, the components 122, 124, 126, and/or 128 modify one or more of the received signals 112A, 114A, 116A, 118A according to the control signals 142 selected by the user through user interface 140. For example, block 509 may involve the formants modifier 122 modifying the formants signal 112A by converting LPC coefficients of the input signal to LSPs, modifying the LSPs in accordance with the control signals 142, and then converting the modified LSPs back into LPC coefficients. One exemplary technique for modifying the LSPs is shown by Equation 1, below.

$$LSP_{new}(i)=LSP(i)*F*(11-i)/(F+10-i) \quad [1]$$

where: i ranges from one to ten.

F is a formants shifting factor with a range of 0.5 to 2, depending upon the desired effect of the associated voice font.

When F=1, for example, LSPnew(i)=LSP(i) and there is no shifting.

Another technique for shifting formants is expressed by Equation 2, below.

$$LSP_{new}(i)=LSP(i)*F \quad [2]$$

where: i ranges from one to ten.

F is a desired formants shifting factor.

Another technique for modifying the formants is described below with FIG. 6.

As an example of block 510, the voicing modifier 124 may involve changing the voicing signal 114A to change the input speech 108 to a different property of voiced, unvoiced, or mixed. As an example of block 512, the pitch modifier 116 may modify the pitch signal **116*a*** by multiplying by a predetermined coefficient (such as 0.5, 2.0, or another ratio), multiplying pitch by a matrix of differential coefficients to be applied to different syllables or time slices or other components, replacing pitch with a fixed pitch pattern of one or more pitches, or another operation.

As an example of block 514, the gain modifier 128 may modify the signal 118A so as to normalize the gain of the input speech 108 to a predetermined or user-input value.

After speech conversion 507, decoding 515 occurs. In block 516, the excitation signal generator 132 receives the voicing, pitch, and gain signals (with any modifications) from the converter 104 and provides a representative LPC residual signal at 132A. Thus, the generator 132 performs an inverse of one function of the LPC analyzer 112. In block 518, the synthesizer 134 applies inverse LPC processing to the formants (from the formants modifier 122) and the residual signal 132A (from the generator 132) in order to generate a representative speech output signal at 134A. Thus, the synthesizer 134 performs an inverse of one function of the LPC analyzer 112. In one embodiment, the output 134A of the LPC synthesizer 134 may be utilized as the output speech 136.

Alternatively, as discussed above, the speech signal **134*a* output by the LPC synthesizer 134 may be routed back for more speech conversion in block 519. Namely, in block 520, the post-filter 120 modifies the LPC synthesizer's signal according to the user-selected voice font, in which case the output of the post-filter 120 (rather than the synthesizer 134) constitutes the output speech 136. In one embodiment, the post-filter 120 performs spectral slope modification of the output speech. The post-filter 120** may apply filtering such as low pass, high pass, or active filtering. Some examples include a finite impulse response or infinite impulse response filter. A more particular example is a filter that applies a function such as y(n)=x(n)+x(n−L) to generate an echo effect.

One type of speech conversion involves modifying speech formants by scaling. Scaling formants has the same or similar effect as changing the vocal tract length of the original speaker. Since vocal tract length is highly correlated with height, formant scaling thus results in speech that is perceived as originating from a speaker that is taller or shorter than the original speaker. This type of modification is therefore desirable in applications that require the identity of the speaker to be altered, either to match a target speaker, or to obtain the characteristics of a non-physical personality. For example, this capability may be desirable in generating synthetic speech from multiple speakers.

In discrete time systems, a sampler or analog-to-digital converter (ADC) may be included before the pre-filter 110 in FIG. 1. The ADC may sample an analog voice signal according to a sample rate such as 64, 32, 16, 8, etc. kilosamples per second. Such discrete time systems can only represent frequencies below the Nyquist rate, which is half the sample rate. Therefore, when scaling by factors greater than one, a method is needed to avoid scaling formants above the Nyquist rate. The spectral envelope should be truncated in some fashion. Truncation is complicated by the fact that most model-based systems do not explicitly parameterize formant frequencies. Instead, formants are usually implicitly carried in linear predictive code (LPC) coefficients.

A method is described below to modify LPCs, or one of many closely related parameter sets, to achieve formant scaling with spectrum truncation. The described method may permit arbitrarily large scale factors, while properly removing formants as they approach and/or surpass a determined frequency threshold. The ability to interpolate between frames may be preserved, even if some frames do not require truncation of the spectrum envelope. The method may involve relatively low computational complexity, i.e., the method may apply a sequence of algorithms used individually or separately in LPC-based speech processing systems.

A possible less desirable method is to up-sample a signal, apply the scaling, then down-sample back to the original rate. This method, however, may add unnecessary complexity, especially for systems operating in the LPC domain since speech signals must be synthesized at the higher rate, down-sampled, and then re-analyzed at the original rate to return to the LPC domain after modifications.

Another possible less desirable method is to indiscriminately decrease the LPC order for all frames of speech. This method decreases the number of formants by reducing the model's ability to represent speech, whether or not the scaled spectrum requires truncation. Order reduction only on selected frames is disadvantageous because interpolation between frames of different orders is not possible. Thus, the quality of all frames may be diminished, even those that did not require truncation.

Another possible less desirable method may "warp" frequencies, such that the scaling factor is a function of frequency. In this method, low frequency formants may be scaled more than high frequency formants, which prevents high frequency formants from crossing the Nyquist boundary. This method may have the undesirable side effect of altering acoustic phonetic characteristics of the speech and result in diminished quality and intelligibility. Large scale factors with this method may result in unstable performance.

Finally, another alternative is to find the complex roots of the linear prediction polynomial, move the roots in the complex plane, and then recompute the prediction polynomial. However, finding complex roots of high order polynomials may be computationally very expensive.

FIG. 6 illustrates a method that may be implemented by one or more components shown in FIG. 1 as a part of the flowchart of FIG. 5. In block 600, the LPC analyzer 112 uses a speech signal to derive Mth order linear predictive coding (LPC) coefficients, e.g., $a_1, \ldots a_8$.

In block 602, the formants modifier 122 converts the Mth order LPC coefficients to line spectral pairs (LSPs), e.g., $c_1, \ldots c_8$.

In block 604, the formants modifier 122 receives a scale factor (from the user or another source) and scales the LSPs (i.e., formants) by multiplying the LSPs by the scale factor (e.g., a constant) to produce scaled LSPs, e.g., $c_{s1}, \ldots c_{s8}$.

In block 606, the formants modifier 122 determines and removes any pair of scaled LSPs with one or both coefficients in the pair above a frequency threshold, which leaves a Pth order set, where P<M, e.g., remove $c_{s5}, \ldots c_{s8}$ so left with $c_{s1}, \ldots c_{s4}$. The threshold frequency may be, for example, the Nyquist rate (half the sampling rate) or a frequency configured by a user.

In block 608, the formants modifier 122 converts the truncated, scaled LSPs to the LPC domain to obtain Pth order LPCs, e.g., $a_{s1}, \ldots a_{s4}$ In block 610, the formants modifier 122 pads the LPCs with M-P zeros, e.g., $a_{s1}, \ldots a_{s4}, 0, 0, 0, 0$. LPCs may represent coefficients of a polynomial. Since roots may be important rather than the coefficients, zeros may be added. Adding zeros may represent adding redundancy, but not adding more information, i.e., roots of polynomial $a_{s1}, \ldots a_{s4}$ are the same after zeros are added.

In block 612, the formants modifier 122 (or LPC synthesizer 134) converts LPCs to LSP domain to obtain new Mth order LSPs, e.g., $c_{s1}', \ldots c_{s8}'$.

In block 614, the formants modifier 122 (or LPC synthesizer 134) performs interpolation and/or other operations with new Mth order LSPs and LSPs of other Mth order frames, e.g., previous frame(s). Speech synthesis, or perhaps non-real-time applications, can interpolate with both past and/or future frames.

In block 616, the formants modifier 122 (or LPC synthesizer 134) converts LSPs to LPCs.

In block 618, the LPC synthesizer 134 re-synthesizes/reconstructs speech (e.g., by using an all-pole filter) with the scaled formants.

The method described in FIG. 6 is capable of scaling speech formants and removing formants above a certain threshold frequency (e.g., the Nyquist rate). The sampling rate may not be changed, and frames whose spectra are truncated can be interpolated in the LSP domain with frames that did not require truncation. Therefore, this new method can operate on isolated frames, or uniformly on every frame, without disrupting the ability to interpolate between frames. The sequence of algorithms applied may use algorithms commonly available in speech processing systems. The conversion method of FIG. 6 may be more stable than other proposed methods, so the conversions do not have to be fixed, pre-determined or stored in a voice fonts library 130. A user can design a voice that matches the user's personal preferences, e.g., make a voice sound like that of a taller or larger person.

Other Embodiments

While the foregoing disclosure shows a number of illustrative embodiments of the application, it will be apparent to those skilled in the art that various changes and modifications can be made herein without departing from the scope of the application as defined by the appended claims. Furthermore, although elements of the application may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present application contemplates various changes beyond such specific order.

What is claimed is:

1. A method for modifying a speech signal, the method comprising:

receiving, by a formants modifier of a speech converter of a speech processing system, Mth order linear predictive coding (LPC) coefficients representative of an input speech signal;

converting the Mth order LPC coefficients to Mth order line spectral pairs (LSPs), by the formants modifier;

multiplying, by the formants modifier, the Mth order LSPs by a scale factor to produce scaled Mth order LSPs;

removing, by the formants modifier, any pair of scaled LSP with at least one coefficient in the pair above a frequency threshold to produce a Pth order set of LSPs, where P<M;

converting the Pth order set of scaled LSPs to a Pth order set of LPCs, by the formants modifier;

padding the Pth order set of LPCs with M-P zeros, by the formants modifier;

converting the Pth order set of LPCs padded with zeros to a second Mth order set of LSPs, by the formants modifier;

processing, by the formants modifier, the second Mth order set of LSPs and at least a third set of Mth order LSPs of another frame;

converting the processed LSPs to processed LPCs, by the formants modifier; and re-synthesizing speech, by an LPC synthesizer of a decoder of the speech processing system, using the processed LPCs.

2. The method of claim 1, wherein the frequency threshold is a Nyquist rate.

3. The method of claim 1, wherein the frequency threshold is half a sampling rate.

4. The method of claim 1, further comprising determining which pairs of the scaled LSPs have at least one coefficient above the frequency threshold.

5. The method of claim 1, wherein the processing comprises interpolation with the second Mth order set of LSPs and at least a third set of Mth order LSPs of another frame of speech samples.

6. The method of claim 1, wherein the scale factor is greater than one.

7. The method of claim 1, wherein the scale factor is part of a set of parameters corresponding to a control signal.

8. The method of claim 1, further comprising retrieving the linear predictive coding (LPC) coefficients from a memory.

9. The method of claim 1, further comprising converting text to speech.

10. An apparatus comprising:

a formants modifier comprising:

a receiver configured to receive Mth order linear predictive coding (LPC) coefficients representative of an input speech signal and a scale factor;

a first converter configured to convert the Mth order LPC coefficients to Mth order line spectral pairs (LSPs);

a multiplier configured to multiply the Mth order LSPs by the scale factor to produce scaled Mth order LSPs;

an extractor configured to remove any pairs of scaled LSPs with at least one coefficient above a frequency threshold to produce a Pth order set of LSPs, where P<M;

a second converter configured to convert the Pth order set of scaled LSPs to a Pth order set of LPCs;

an inserter configured to pad the Pth order set of LPCs with M-P zeros;

a third converter configured to convert the Pth order set of LPCs padded with zeros to a second Mth order set of LSPs;

a processor configured to process the second Mth order set of LSPs and at least a third set of Mth order LSPs of another frame; and a fourth converter configured to convert the processed LSPs to processed LPCs; and a synthesizer configured to re-synthesize speech using the processed LPCs.

11. The apparatus of claim 10, wherein the frequency threshold is a Nyquist rate.

12. The apparatus of claim 10, wherein the frequency threshold is half a sampling rate.

13. The apparatus of claim 10, wherein the extractor is further configured to determine which pairs of scaled LSPs has at least one coefficient above the frequency threshold.

14. The apparatus of claim 10, wherein the processor is further configured to interpolate the second Mth order set of LSPs and at least a third set of Mth order LSPs of another frame of speech samples.

15. The apparatus of claim 10, wherein the scale factor is greater than one.

16. The apparatus of claim 10, wherein the scale factor is part of a set of parameters corresponding to a control signal.

17. The apparatus of claim 10, wherein the apparatus is a speech synthesizer.

18. The apparatus of claim 10, further comprising a memory to store the Mth order linear predictive coding (LPC) coefficients.

19. The apparatus of claim 10, further comprising a text-to-speech (TTS) converter.

20. The apparatus of claim 19, wherein the text-to-speech (ITS) converter is configured to control the scale factor.

21. The apparatus of claim 10, further comprising a user interface configured to receive inputs to control the scale factor.

22. An apparatus comprising a processor and a memory configured to store a set of instructions executable by the processor, the set of instructions comprising:

receiving Mth order linear predictive coding (LPC) coefficients representative of an input speech signal;

converting the Mth order LPC coefficients to Mth order line spectral pairs (LSPs);

multiplying the Mth order LSPs by a scale factor to produce scaled Mth order LSPs;

removing any pairs of scaled LSPs with at least one coefficient above a frequency threshold to produce a Pth order set of LSPs, where P<M;

converting the Pth order set of scaled LSPs to a Pth order set of LPCs;

padding the Pth order set of LPCs with M-P zeros;

converting the Pth order set of LPCs padded with zeros to a second Mth order set of LSPs;

processing the second Mth order set of LSPs and at least a third set of Mth order LSPs of another frame;

converting the processed LSPs to processed LPCs; and re-synthesizing speech using the processed LPCs.

23. An apparatus comprising:

means for receiving Mth order linear predictive coding (LPC) coefficients representative of an input speech signal;

means for converting the Mth order LPC coefficients to Mth order line spectral pairs (LSPs);

means for multiplying the Mth order LSPs by a scale factor to produce scaled Mth order LSPs;

means for removing any pair of scaled LSP with at least one coefficient in the pair above a frequency threshold to produce a Pth order set of LSPs, where P<M;

means for converting the Pth order set of scaled LSPs to a Pth order set of LPCs;

means for padding the Pth order set of LPCs with M-P zeros;

means for converting the Pth order set of LPCs padded with zeros to a second Mth order set of LSPs;

means for processing the second Mth order set of LSPs and at least a third set of Mth order LSPs of another frame;

means for converting the processed LSPs to processed LPCs; and means for re-synthesizing speech using the processed LPCs.

* * * * *